Patented Apr. 20, 1954

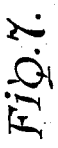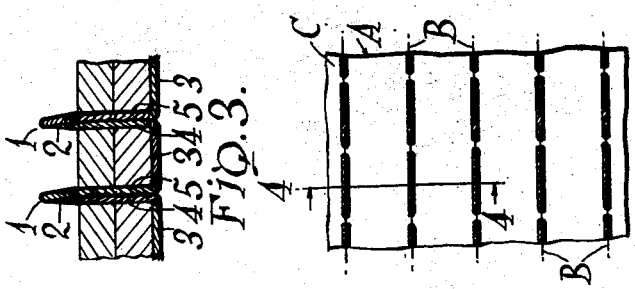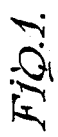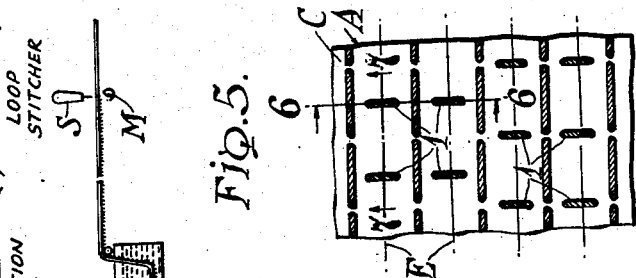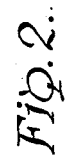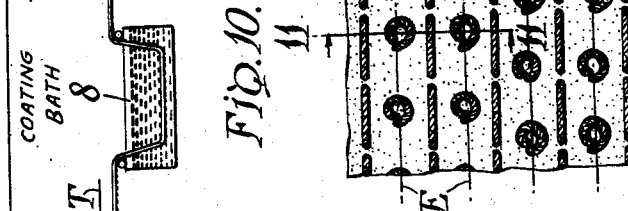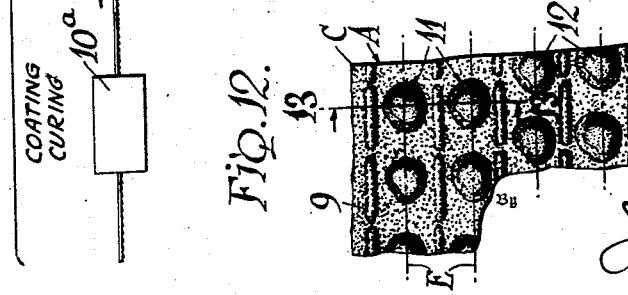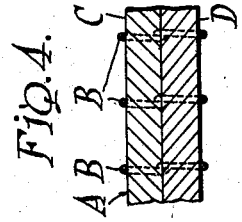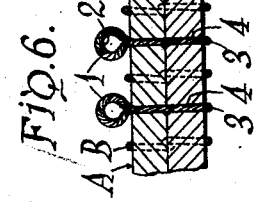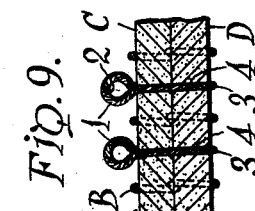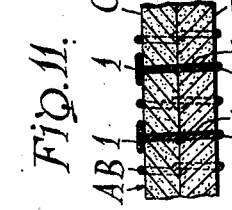

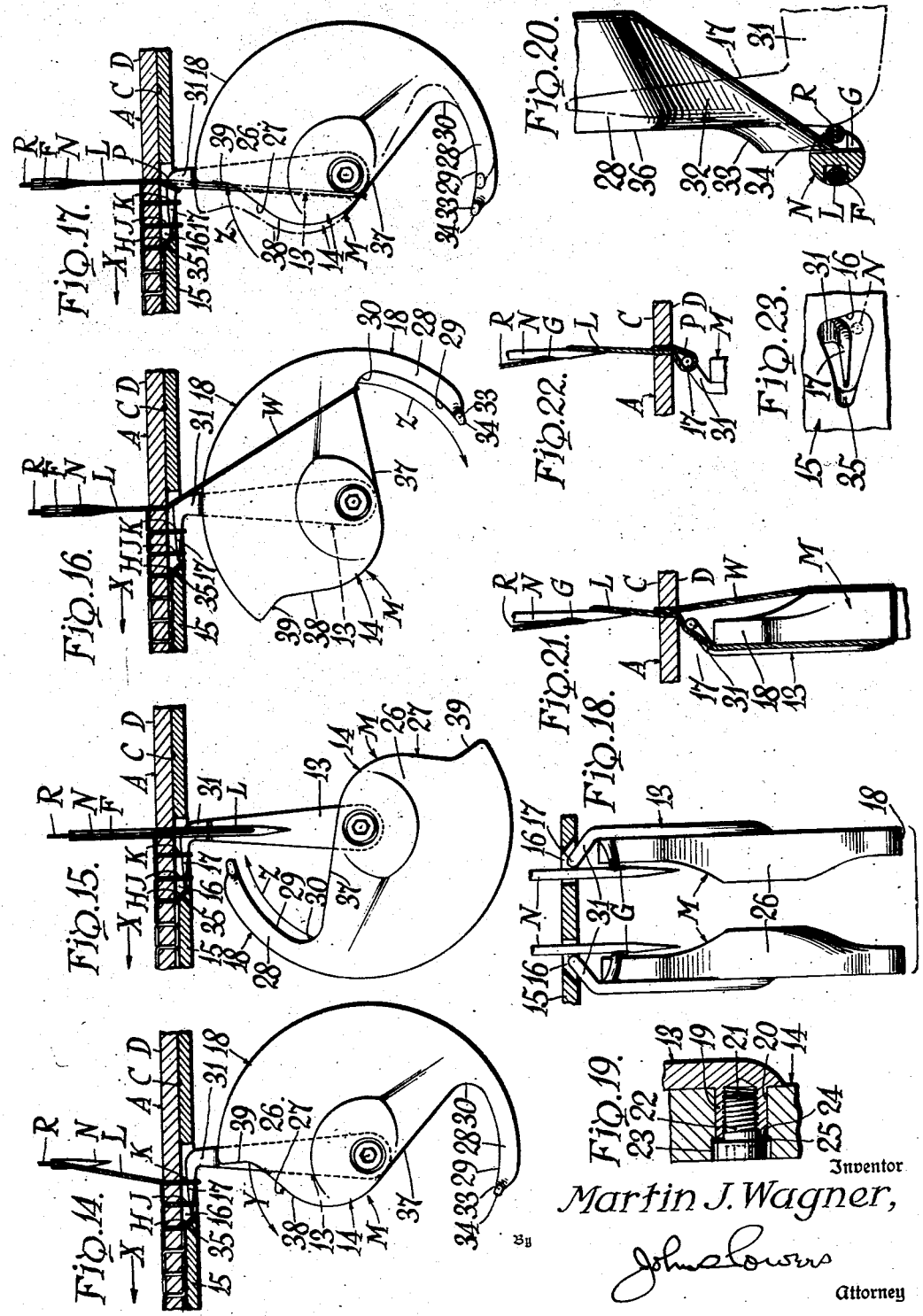

2,675,906

UNITED STATES PATENT OFFICE 2,675,906

CONVEYER BELT OF TEXTILE FABRIC HAVING A CONVEYER SURFACE OF CURED LATEX

Martin J. Wagner, Buffalo, N. Y., assignor to Globe Woven Belting Company, Inc., Buffalo, N. Y., a corporation of New York Application November 21, 1951, Serial No. 257,631

4 Claims. (Cl. 198—198)

This invention relates to improvements in conveyer belts of the type which are composed of textile fabric and in which the conveyer surface is provided by a cured latex coating. The improvements are directed to novel and advantageous characteristics of the conveyer surface and are applicable alike to belts of the stitched canvas type (which have two or more plies) and to woven belts.

Belts of textile fabric are used as interior conveyers for the transport of packages, for example, cartons, from one part of the building to another. Where the packages are to be moved between different elevations, e. g. from one floor to another, stitched canvas belts are used. For flat travel woven belts are used, these, however, not being suitable for inclined travel because they do not have adequate provision against the slippage of the packages. In manufacture the textile fabric belting is first saturated with a suitable latex solution which has moisture-proofing value and which also "sets" the belt, that is to say substantially prevents it from stretching in the course of use. After the saturation step the coating solution, similar to the saturating solution, is applied, the coating being then cured. The surface provided by the cured coating is very slightly yieldable and is intrinsically of a character to oppose frictional resistance to the slippage of the packages. In stitched canvas belting the frictional resistance is applied by a multiplicity of spaced projections upon which the packages rest and which are provided by the tensioned parts of the lock stitching which project slightly beyond the surface of the canvas. These projections provide a roughened anti-slipping surface of very slight yielding quality. However due to the smallness of the projections and their comparatively wide separation, as dictated by the lines of stitching, they present an overall direct supporting surface which is a comparatively small fraction of the overlying area of the bottom of the package. These characteristics prescribe a limiting factor, adverse in degree, in respect to the angle of repose of the packages, i. e., the grade at which the belt may travel without liability of their slippage. Generally speaking the permissible grade is, on the average, of about 12° with about 18°, depending on a suitable degree of weight of the packages, as a possible maximum.

The principal object of the invention is to provide a conveyer belt of textile fabric in which the frictional resistance to the slippage of the packages is greatly increased and which, with regard to packages of comparable dimensions and weights, may have a substantially greater degree of grade of movement, that is to say in which the angle of repose of the packages is substantially increased. Thus in most cases the grade may be of the order of 26° and in other cases, depending on the weight of the packages, may be increased as high as 32°. The improvements by which this object is achieved as applied to woven belting enable woven conveyer belts to travel in either direction along inclined paths of the range of degree stated without liability of the slippage of the packages.

By reason of this object important advantages are served in connection with the installation of internal conveyer belt systems. Thus (1) a system of conveyer belts in accordance with the invention will require for the transport of packages between different elevations considerably less space than a system of conveyer belts of the known character above described operating between the same elevations and hence may be used in existing buildings, the dimensions of which may not be sufficient for a comparable system of conveyer belts of known construction; (2) a conveyer belt in accordance with the invention may be economically available for certain stacking operations which cannot be satisfactorily carried out by conveyer belts of the known construction above described; and (3) in a number of instances, as compared with conveyer belts of the known construction above described, the operations can be carried out with a smaller number of belt units, i. e. individual belts, with resultant economy in the installation in respect to the belting and the shafting which the conveyer system may require.

A further object is to provide a conveyer belt having the above novel and advantageous operating characteristics which may be produced at a cost, comparable for all practical purposes, with the cost of production of belts of the known construction above described, the increment of cost in connection with the features of the invention being comparatively negligible.

A further object is to provide a belt in which the features of the invention are integrated, so to speak, with the fabric of the belt in such manner that they cannot be adversely affected by the movements of the belt over the driving and supporting rollers whereby the efficient life of the belt will be comparable to that of a belt of the known construction above described as used for similar work.

With the above objects in view a belt in accordance with the invention is characterized, generally speaking, by substantially uniform loops of thread or yarn of suitable gage which are integrated with the fabric of the belt, project beyond its supporting surface, and are generally comparable in number and arrangement to the exposed portions of the lock stitching of the usual stitched canvas belting. The loops as saturated in the saturation bath are folded or pressed with adhering effect upon the surface of the similarly saturated belt with the result that they are flattened, so to speak, and covered by the coating solution and, as flattened and coated, are stably maintained to present a multiplicity of closely associated projecting pads of resilient and yieldable character. These pads, individually considered, have relatively large surface areas which intrinsically oppose substantial frictional resistance to the slippage of the packages and, considered in the aggregate, provide a roughened anti-slipping surface which is a very substantial fraction, e. g. twenty-five percent or more, of the overlying area of the bottom of the package and is responsive, in yielding, to the weight of the package. The anti-slipping surface so characterized independently provides for the substantial increase of the grade of travel of the belt in either direction as above described. The anti-slipping effect is, however, enhanced by the fact that those pads which may adjoin the lower transverse edge of the supported package, and hence do not receive the compressive effect of the weight of the package, present anti-slipping abutment or booster surfaces which, although not in the nature of positively acting retaining shoulders, provide an anti-slipping factor of substantial degree, the value of which is best realized in the case of packages of more than average weight and of grades exceeding 26°. In the broader aspect of the invention the loops can be produced by weaving. However in a more specific aspect, and for the reason of greater manufacturing economy, the loops are produced by stitching of special and novel character as herein shown and described.

In the manufacture of a belt in accordance with the invention the special loop stitching is applied either to stitched canvas belting, in which case it is located between the lines of lock stitching, or to woven belting, the loops at such time projecting in upright relation from the surface which becomes the supporting surface of the belt. The loop-bearing belting is passed through the saturation bath in which, together with the loops, it is thoroughly impregnated with the latex solution. Before this solution sets the belting is passed between pressure rolls which bend the loops upon the surface of the belting and act with a degree of pressure such that, the solution at that time having a substantial adhesive property, the loops are caused permanently to adhere to the surface of the belting, the loops then being flat and in a common plane parallel to the plane of the belting. The belting is then passed successively through a heating medium which dries or "cures" the saturating solution and through the bath of coating solution with the result that it is entirely covered by the coating material which also completely covers the individual loops, additionally bonding them to the surface of the belt and also completely filling, in core-like fashion, the openings or recesses which the loops may define. From the bath of coating solution the belt passes through a second heating chamber in which the coating is cured, the belting being now ready for manufacture into belts and the loops providing the pads as above generally described which have their yielding quality due both to the resilience of the cured coating material and the resilience of the loop thread or yarn. The saturation step, the loop pressing and flattening step with consequent adherence of the loops to the surface of the belting, the coating step and the curing step are preferably, and as herein shown, performed in continuous sequence. For the application of the loop stitching a machine having two needles is conveniently used; and the belting, in accordance with its particular width, may be run through this machine such a number of times as may be necessary to effect the disposition of the loops in parallel longitudinal lines uniformly spaced in such relation as is necessary for the purpose of the invention throughout the transverse extent of the belting. In the repetition of the loop stitching operations no effort is made to cause the loops to be in alinement in the transverse direction of the belting. Consequently in the transverse direction of the belting there is a somewhat irregular staggering of the loops with the result that the pads do not have any regular transverse alinement. This lack of regularity of transverse alinement of the pads has been found to be beneficial in enhancing the anti-slipping quality of the supporting surface of the belt.

Insofar as I am aware there is no prior mechanism which is available for the formation of the controlled loops of substantially uniform character by which the invention is characterized. For this reason I have shown and described herein, in such detail as is deemed necessary, a mechanism for effecting the loop stitching, this mechanism being the subject of a copending application of Frederick J. Peters, Serial No. 257,574.

In the accompanying drawings:

Figure 1 is a diagrammatic side elevation showing the application of the special loop stitching to stitched canvas belting, it being understood that the loop stitching is applied in the same way and to the same extent to woven belting.

Figure 2 is a diagrammatic side elevation showing the continuous sequence of the steps of belt saturation, loop pressing and flattening, belt coating and belt coating curing.

Figure 3 is a fragmentary plan view showing standard stitched canvas belting.

Figure 4 is a cross sectional view on the line 4—4 of Figure 3.

Figure 5 is a fragmentary plan view showing the special loop stitching applied to stitched canvas belting by the loop stitching operation indicated in Figure 1.

Figure 6 is a cross sectional view on the line 6—6 of Figure 5.

Figure 7 is a longitudinal sectional view on the line 7—7 of Figure 5.

Figure 8 is a fragmentary plan view showing the belting to which the loop stitching has been applied immediately after its treatment in the saturation bath.

Figure 9 is a sectional view on the line 9—9 of Figure 8.

Figure 10 is a fragmentary plan view showing the belting after the operation of the pressure rolls by which the loops are flattened and caused to adhere to the surface of the belting.

Figure 11 is a sectional view on the line 11—11 of Figure 10.

Figure 12 is a fragmentary plan view showing the belting after its treatment in the bath of coating solution.

Figure 13 is a sectional view on the line 13—13 of Figure 12.

Figures 14 to 22 are views showing the mechanism for the formation of the loop stitching.

Figure 14 is a diagrammatic side elevation of a loop stitching mechanism with the belt in section and with the loop holding feature engaged with two loops formed by previous operations.

Figure 15 is a similar view showing the starting position of the loop forming feature in connection with the formation of a third loop.

Figure 16 is a similar view showing the loop forming feature approximately midway in the course of its movement for the formation of a third loop.

Figure 17 is a similar view with the loop forming feature in the same position in which it is shown in Figure 14, namely at the completion of its operation in which the loop has been released for engagement by the loop holding feature, this figure however showing the loop holding feature as engaged with three loops, the other two loops with which it is engaged being shown in Figure 14.

Figure 18 is a diagrammatic front elevation showing the loop forming mechanisms in association with the needles of a sewing machine, this elevation assuming a view of the cam faces of the loop forming elements when they are in their positions as shown in Figure 15.

Figure 19 is a fragmentary cross sectional view on an enlarged scale showing details of the connections between the loop holding feature and the loop forming feature.

Figure 20 is a view on an enlarged scale showing a needle in horizontal section and the terminal finger of the loop forming feature in plan view and at the inception of its engagement with the thread which has been pushed through and below the belting by the needle.

Figure 21 is a partial rear elevation of the loop forming mechanism and assumes that the loop forming element is in the position shown in broken lines in Figure 17, the belting being shown in cross section.

Figure 22 is a partial rear elevation of the loop forming mechanism and assumes that the loop forming element is in the position shown in full lines in Figure 17, the belting being shown in cross section.

Figure 23 is a fragmentary plan view of the plate which cooperates with the loop holding element.

The features which constitute the invention are shown in connection with stitched canvas belting A which, in accordance with standard practice, is composed of plies connected by parallel longitudinal lines of lock stitching B effected by the usual sewing machine. The belting has a face C which, for convenience, may be called its "upper" face and which, in the finished belt, is the supporting face upon which the packages rest, the opposite or "lower" face being indicated at D.

Belts in accordance with the invention are characterized by loops 1 of thread or yarn of suitable gage which project beyond the face C and are provided by lines of special loop stitching E. In the manufacture of the belting the loops 1 originally project in upright relation (Figure 6) and in the finished belt lie directly upon the face C (Figure 11) in a common parallel plane. In this relation the loops may be said to be "flattened."

Excellent results have been obtained with loops 1 which are of approximately circular outline, delimiting openings 2, each of a diameter which is a substantial fraction, i. e. of the order of a third, of the outside diameter of the loop; which initially project approximately one eighth of an inch from the face C and are carried by adjoining thread portions extending through the belting and spaced approximately one fourth of an inch in both directions i. e. transversely and longitudinally, from adjacent adjoining thread portions. These dimensions are by way of example, it being obvious that the invention contemplates a limited range of selection, compatible with its primary object above stated, in respect to the dimensions of the loops 1 and the extent of their spacing. In the usual stitched canvas belting the lines of lock stitching B are spaced approximately one-fourth of an inch. It is practical and preferable to have the lines of loop stitching E midway between and parallel to the lines of lock stitching. The same dimensions and spacing of the loops is, of course, followed in connection with woven belting embodying the invention.

The special loop stitching E has the general characteristics of the well known fair stitching by which the outer sole of a shoe is bonded to the welt, differing, however, in the feature of controlled loops of substantially uniform dimensions projecting from that face of the belting which in the finished belt is the supporting face. The loop stitching is effected by the mechanism shown in Figures 14 to 22 which is later described in such detail as is herein necessary. This mechanism is diagrammatically indicated at M in Figure 1 and is incorporated in a conventional sewing machine S in substitution for the usual bobbin carrier. Each line of loop stitching follows a path which involves straight alined thread portions 3 adjoining the face D, parallel adjoining thread portions 4 and 5 extending through the fabric of the belting in normal relation to adjacent thread portions 3 at adjacent ends thereof, and the loops 1 connecting the upper ends of the thread portions 4 and 5. The loops 1 adjoin the face C and, as coated and held flat upon the surface C, anchor the stitching to the fabric of the belting.

The loop bearing belting is first treated in the saturation bath 6 in which the belting fabric and the loops are thoroughly impregnated with the latex solution. After saturation the loops, as shown in Figures 8 and 9, remain in their initial upright relation with respect to the face C. The saturation step is followed by the step of flattening the loops, i. e., bending them to lie flat upon, and to adhere to, the face C. This may be accomplished by pressure rolls 7, the belting immediately after the operation of the pressure rolls being shown in Figures 10 and 11. The belting is passed through the pressure rolls before the saturation solution sets and while it still retains substantial adhesive property. Hence when the loops are pressed flat they strongly, and permanently, adhere to the face C. After the loop flattening operation the belting is passed through a heating chamber 10 in order to dry or "cure" the saturating solution. This is followed by the treatment of the belting in the bath of coating solution 8. The coating solution may be pigmented but it is otherwise of the same general character as the latex saturation solution. The coating solution provides a continuous coating 9 (Figures 12 and 13) which completely covers, and adheres to, the belting and the loops, filling the openings 2 and providing an additional bond for the loops as lying flat against and adhering to the face C.

The loops 1 as covered by the coating solution present closely associated pads 11 (Figures 12 and 13) which have a measure of resilience and upon which the packages rest. These pads constitute the roughened anti-slippage supporting surface of the belt and, generally speaking, are of sensibly greater diameter than the loops by which they are formed, their transverse diametrical dimensions extending to or very close to the adjacent parallel lines of longitudinal surface threads of the lock stitching B and their longitudinal diametrical dimensions being sensibly greater than the extent of spacing of adjacent pads in a longitudinal row. In cross sectional outline the pads resemble flat-topped bosses with rounded or bevel-like peripheral portions extending toward the coated surface of the fabric of the belt. The flat tops of the pads are best shown in Figure 13 and are indicated at 12. Their areas are substantial, being in each instance a major fraction of the total area of the pad and, in the aggregate, presenting a roughened anti-slippage supporting surface which is a substantial fraction of the area of the overlying bottom of the package, i. e. a fraction within the general range of approximately twenty-five percent to approximately forty percent.

The final step in the manufacture of the belting is its treatment in the heating chamber 16a for the purpose of drying or curing the coating, this operation being performed without vulcanizing effect and leaving the coating entirely dry and stable and with a desirable measure of resiliency. When the curing step has been completed the belting is ready for manufacturing into belts wherein the supporting face, i. e. the face C, has the characteristics above described and sufficiently shown in Figures 12 and 13.

The sequence of steps of saturating the belt, flattening the loops, applying the coating and curing the coating is preferably carried out in connection with a continuous feed movement of the belt. This movement is indicated by the arrow T in Figure 2 and is effected by well-known mechanism, illustration of which is deemed unnecessary.

The conventional sewing machine for the lock stitching includes a pair of needles which are spaced an inch apart and operate in unison, each needle being associated with a bobbin carrier. In the lock stitching the belting is initially fed through the machine with the result of two parallel lines of lock stitching spaced by an inch. The belting is then shifted laterally through a quarter of an inch and again fed through the machine, the operation being repeated until all the lines of lock stitching are formed at quarter inch intervals.

In the special loop stitching by which a belt in accordance with the invention is characterized the two needles of the conventional sewing machine may be advantageously retained and the sequence of feeding the belting repeatedly through the machine to form the lines of loop stitching E is the same.

The special loop stitching mechanism is incorporated in a conventional sewing machine of the type used for lock stitching. Figure 18 shows the two needles N and the two similar loop stitching mechanisms, one for each needle, the duplication of the needles and the loop stitching mechanisms in the same machine being sufficiently indicated by a bracket. The description of a single loop stitching mechanism will be applicable to both of the mechanisms shown in Figure 18.

The special loop stitching mechanism M (the subject of the above mentioned co-pending application of Frederick J. Peters) is sufficiently shown for the purpose of this specification in Figures 14 to 23 and is incorporated in a conventional sewing machine of the type which forms the standard lock stitching.

The loop stitching mechanism comprises a relatively stationary loop holding element 13, an oscillatory loop forming element 14 and a horizontal plate 15 which provides a part of the supporting surface for the belt and which is formed between its upper and lower faces with an opening 16 of novel form which provides for the operation of the needle and also accommodates a horizontal projecting tapering pointed finger 17 at the upper end of the loop holding element 13 and guides each loop in its movement away from the finger. The finger 17 extends in the direction of the feed movement of the belting. The loop forming element 14 is pivotally connected at a point coincident with its axis of oscillation to the lower end of the loop holding element 13. The end walls of the opening 16 are adjacent the ends of the finger 17 and thereby serve to hold the loop holding element 13 relatively stationary during the oscillation of the loop forming element 14. The modification of the conventional sewing machine to produce the special loop stitching consists in the substitution of the novel loop forming element 14 and the associated loop holding element 13 for the usual bobbin carrier and of the plate 15 for the usual plate through which the needle operates.

The loop forming element 14 is mounted similarly to the bobbin carrier for which it is substituted, the supporting frame of annular outline (not shown) for the bobbin being utilized. Accordingly the loop forming element 14 has a circularly curved bearing face 18 similar to the bearing face of the bobbin carrier and which similarly and conformably engages the inner curved face of the supporting frame. The oscillation of the loop forming element 14 is effected by the same mechanism (not shown) which in the conventional machine for lock stitching effects the oscillation of the bobbin carrier. The loop holding element 13 is in the form of an upright arm which at its lower end (Figure 19) is provided with a laterally projecting stud 19 of circular cross section. The stud 19 is coincident with the axis about which the loop forming element 14 oscillates and is somewhat loosely fitted in a transverse opening 20 in the element 14, the loose fit enabling the free oscillation of the loop forming element relatively to the loop holding element 13. The stud 19 is formed with an axial threaded recess 21 for a screw 22 by which the assembly of the elements 13 and 14 is maintained. The opening 20 has an enlargement 23 beyond the stud 19 to accommodate the head of the screw 22 and also to provide an annular shoulder 24 as an abutment for a bearing washer 25.

The element 14 includes a body 26 which may be said to be in the form of a mutilated disc. The bearing face 18 is the peripheral edge face of the body 26 which is otherwise characterized by a cam edge face designated generally as 27. The element 14 also includes an arm 28 formed as an extension of the body 26 and along which the face 18 is continued, the arm 28 having a curved inner face 29 concentric with the face 18.

The cam face 27 extends from one end of the face 18 to the inner end of the face 29 and terminates in a component 30 of a suitable degree of reverse curvature which merges with the face 29. The finger 17 at the upper end of the loop holding element 13 is laterally offset as at 31, as best shown in Figures 18, 21, 22 and 23, with its inner side closely adjacent the needle N when projecting beyond the lower face of the belting A. In the course of the operation of the element 14 the arm 28 moves directly below the offset 31. The arm 28 terminates in a finger 32 which extends in a direction generally opposite to the finger 17 and has at its end a short lateral extension 33 terminating in a point 34. The extension 33 is offset from the side of the finger 32 which is remote from the upright part of the loop forming element 13 and the point 34 of the extension 33 is directed laterally slightly beyond the inner face of the finger 17.

The loop forming element 14 has an operative stroke and a return stroke. During its operative stroke it first forms an extended bight W in the thread, this bight being held under tension by the usual reciprocating sewing machine thread carrier (not shown) and becoming the ultimate loop, and thereafter release the bight which is thereupon tensioned about the finger 17 and held by it in the form of a loop 1 until the next downward stroke of the needle through the belting A. The needle N is of the standard construction used in lock stitching and has on its opposite sides the usual thread channels F and on one side the usual shallow transverse thread clearance groove G which is located above the eye. In Figure 20 the groove G is shown at the right side of the needle and for convenience of description the thread portion in the channel F at the opposite side of the needle and which is connected to the thread carrier is designated L and the thread portion which extends across the groove G and from the face D of the belting is designated R. The operative stroke of the loop forming element 14 is clockwise, the drawings being considered, and during the movement of the arm 28 below the offset 31 the extension 33 enters the groove G as shown in Figure 20 and moves through it and its point 34 picks the thread portion R from the needle.

The needle N operates through the opening 16 which, as shown in Figure 23, is generally pear-shaped. The finger 17 extends toward the narrow end of the opening 16. The wall of the opening 16 at its narrow end has an upward and outward inclination as shown at 35. The needle N operates near the wider end of the opening. When the needle is within the opening 16, its location is adjacent the inner face of the finger 17 at the approximate point where the finger projects from the offset 31, its position being such that the extension 33 of the finger 32 which, as above noted, projects very slightly beyond the inner side of the finger 17, may readily enter and move through the thread clearance groove G of the needle and pick up the thread portion R. In Figure 20 the finger 17 is indicated by broken lines in order to show its relation to the extension 33 during its movement through the groove G of the needle. Since the extension 33 is laterally offset at the end of the finger 32 it will be located beyond the adjacent side face 36 of the finger 28 to an extent such that when it passes beyond the groove G ample clearance with reference to the face 36 will be left for the movement of the needle.

The general pear-shape of the opening 16 provides ample clearance for the loops through which the finger 17 projects. The tapered form of the finger facilitates the movement of the loops away from the finger in connection with the step by step feed of the belting. The inclined face 35 at the narrow end of the opening 16 serves as a guide for the loops during the feed movement of the belting whereby the loops are readily and temporarily folded between the face of the belting beyond which they project and the supporting surface of the machine. When the belting has passed beyond the supporting surface the loops spring back into the positions in which they project in normal relation from the face C as shown in Figures 5 and 6.

The sequence of operations is shown in Figures 14 to 17, the face C at that time being the lower face of the belting and resting upon the supporting surface of the machine. As shown in these figures the movement of the belting is to the left as indicated by the arrows X.

Figure 14 shows the finger 17 in relation to the last three previously formed loops, these being distinguished in the order of their formation as H, J and K. Figure 14 assumes that following the formation of the last loop K a step of movement of the belting has been completed, the loop K being held meantime by the finger 17. In this figure the loop forming element 14 is shown at the completion of an operative stroke and after it has released the bight W (Figures 16, 17, 21 and 22) which has meantime been tensioned about the finger 17 as the loop K; and the needle N is shown fully raised and positioned, with reference to the belting, for its next operative or downward stroke, the completion of which is shown in Figure 15.

From the position shown in Figure 14 the loop forming element 14 moves on its return stroke which is counter-clockwise as is indicated by the arrow Y, Figure 14 being considered. At the completion of this stroke the loop forming element 14 is brought to what may be called its starting position as shown in Figure 15. In this position its arm 28 is located beyond the path of the needle and the needle has completed its downward movement through the belting.

The operative stroke of the loop forming element 14 proceeds from the position shown in Figure 15 and is clockwise as indicated by the arrow Z. During the initial stage of the operative stroke of the loop forming element the extension 33 of the finger 32 passes through the thread clearance groove G of the needle and the point 34 picks the thread from the needle; all as above described and as shown in detail in Figure 20. As soon as the extension 33 passes beyond the groove G the needle returns to its elevated position, as shown in Figures 16 and 17 which also show the loop forming element in further successive stages of its operative stroke during which it has formed the tensioned bight W.

The cam face 27 has two major components 37 and 38. The component 37 is substantially straight and is a bight forming component extending at a suitable acute angle to the inner curved face 29 of the arm 28. The reversely curved component 30 of the cam face 27 extends between the components 37 and the face 29 and forms what may be called the throat of the angle. The component 38 is a curved component and may be called the bight releasing component. It merges with an angularly directed terminal component 39 which extends to the end of the bearing face 18 and provides a shoulder for cooperation with a part of the mechanism (not shown) for effecting the oscillatory movement of the element 14.

When the extension 33 enters the groove G of the needle it passes above the lower end of the thread portion R with the effect of pulling the thread against the tension exercised by the thread holder and starting the bight which, as started, slides relatively along the surface 29 until it engages in the throat provided by the cam component 30. As the movement of the element 14 continues the bight, maintained under tension the while, is elongated. In Figures 16 and 17 the bight is shown partially elongated with its components extending along the sides of the element 14 between the belting and the throat provided by the cam component 30, the straight cam component 37 being shown in Figure 16 as having a slight upward inclination to the right. As the element 14 continues on its operative stroke the cam component 37 is brought to a position of angularity in which the bight may be released. In Figure 17 this position is shown in broken lines and is one in which the straight cam component 37 extends upward to the left at an angle favorable to the movement of the bight from the throat provided by the component 30 to the bight releasing component 38. When the element 14 completes its operative stroke, as shown in full lines in Figure 17, the tension on the bight will have drawn it along the cam component 39, shortening it the while, with the result that the bight has been pulled fully clear of the element 14, and, in its ultimate shortened dimension, has been arrested and held by the finger 17. The bight thus held is the completed loop and is shown at P in Figure 17, its position being at the point where the finger 17 adjoins the offset 31. The position of the element 14 shown in full lines in Figure 17 is the same position in which it is shown in Figure 14. Following the engagement of the newly formed loop by the finger 17 the belt is advanced through a step of its feed movement whereby the loop distinguished as H is folded completely between the belting and the supporting surface of the machine and the other loops distinguished as J, K and P are brought into the same relation as the loops H, J and K shown in Figure 14. Thereafter the element 14 moves on its return stroke as above described until it reaches its starting position shown in Figure 15 at which time the cycle of operations is repeated.

In the foregoing discription I have used the term "latex solution" as a matter of brevity and convenience since, in actual practice, a latex solution, synthetic or natural, is the solution which is used for the saturation of the belt and the coating. It will be understood, however, that any solution which may produce a coating of the requisite properties, that is to say, as dried, presents a suitable anti-slipping surface and has a suitable measure of resiliency, may be used. Hence the term "latex solution" as used herein is to be taken as sufficiently broad to cover any equivalent solution which may not, strictly speaking, be a latex solution.

I claim:

1. A conveyer belt composed of a body of textile fabric, threads integrated with the body and fashioned into loops which project beyond a face of the body, lie in longitudinal rows in flat coplanar relation upon said face and in such relation in the several longitudinal rows have similar equidistant spacing from one another and characterize the supporting face of the belt, and a cured coating derived from a latex solution which uninterruptedly covers the body and the loops, a series of spaced flat-topped pads in raised relation to the adjacent plain face of the belt and formed by the projecting flattened loops, the pads having a measure of resilience, and the flat top of each pad having a surface area which is a major fraction of the surface area of the pad, the pads being in mutually spaced relation and being provided in such number that their flat tops present an aggregate supporting area for antifrictional purposes which is a substantial fraction of the total area of the overlying bottom of a package supported on the belt and may be within a range of approximately twenty-five percent to approximately forty percent of such area.

2. A conveyer belt as set forth in claim 1 wherein the loops are provided as parts of continuous parallel lines of stitching.

3. A conveyer belt as set forth in claim 1 wherein the body is composed of plies of canvas connected by parallel lines of lock stitching and the loops are provided as parts of continuous parallel lines of stitching between and parallel to the lines of lock stitching.

4. A conveyer belt as set forth in claim 1 wherein the loops are adhesively bonded to the face from which they project and are additionally bonded to such face by the coating.

References Cited in the file of this patent

UNITED STATES PATENTS

| Number | Name | Date |
|---|---|---|
| 2,067,647 | Potts | Jan. 12, 1937 |
| 2,242,128 | Hornsby | May 13, 1941 |
| 2,495,808 | Colmant | Jan. 31, 1950 |